United States Patent [19]

Kimura et al.

[11] Patent Number: 4,680,218
[45] Date of Patent: Jul. 14, 1987

[54] MAGNETIC RECORDING MEDIUM

[75] Inventors: Akihiro Kimura, Sagamihara; Toshio Ando, Fujisawa; Toshikazu Nishihara, Zama, all of Japan

[73] Assignee: Victor Company of Japan, Japan

[21] Appl. No.: 779,160

[22] Filed: Sep. 23, 1985

[30] Foreign Application Priority Data

Sep. 29, 1984 [JP] Japan .................... 59-202963
Sep. 29, 1984 [JP] Japan .................... 59-202964

[51] Int. Cl.$^4$ ............................. G11B 5/64; G11B 5/72
[52] U.S. Cl. ..................................... 428/195; 427/131;
428/694; 428/695; 428/900
[58] Field of Search .............. 428/694, 695, 900, 195; 427/131

[56] References Cited

U.S. PATENT DOCUMENTS

| | | | |
|---|---|---|---|
| 4,411,963 | 10/1983 | Aine | 428/694 |
| 4,425,404 | 1/1984 | Suzuki et al. | 428/695 |
| 4,503,125 | 3/1985 | Nelson et al. | 428/695 |
| 4,540,618 | 9/1985 | Suzuki et al. | 428/695 |

Primary Examiner—Paul J. Thibodeau
Attorney, Agent, or Firm—Andrus, Sceales, Starke & Sawall

[57] ABSTRACT

A magnetic recording medium comprises a base, a magnetic layer made of a magnetic material and formed on the base, a lubricant layer made of a lubricant material having lubricity and formed on the magnetic layer, and a corrosion resisting layer made of a corrosion resisting material having corrosion resistance and formed on the lubricant layer. An additional corrosion resisting layer made of a corrosion resisting material having corrosion resistance may be provided between the magnetic layer and the lubricant layer.

7 Claims, 2 Drawing Figures

MAGNETIC RECORDING MEDIUM

BACKGROUND OF THE INVENTION

The present invention generally relates to magnetic recording mediums, and more particularly to a magnetic recording medium having both lubricity and corrosion resistance.

Recently, as a magnetic recording medium for high density recording, a metal thin film type magnetic recording medium has been proposed and reduced to practice. Such a metal thin film type magnetic recording medium comprises a base and a magnetic layer formed thereon. The magnetic layer is made of a magnetic material such as Co, Co—Ni, Co—P, and Co—Ni—P, and the magnetic layer is formed on the base by a method such as sputtering, electroplating, and electroless plating.

Generally, when carrying out a recording or reproduction by use of the type of magnetic recording medium described above, a magnetic head is slightly floated from the magnetic recording medium due to an air film generated by an airflow which occurs as the magnetic recording medium rotates at a high rotational speed. However, the magnetic head makes contact with the magnetic recording medium when the magnetic recording medium starts to rotate until a steady rotational speed is reached, and also when the rotational speed is reduced so as to stop the rotation of the magnetic recording medium. For this reason, the magnetic layer of the magnetic recording medium wears out due to the friction between the magnetic head and the magnetic layer.

Accordingly, in order to prevent premature wear of the magnetic layer due to the friction, a thin film of carbon having lubricity and a small coefficient of friction is conventionally formed on the magnetic layer as previously proposed in a Japanese Published Patent Application No. 33521/1974 and a Japanese Laid-Open Patent Application No. 41524/1981, for example. The magnetic layer is protected from the magnetic head by the provision of the thin carbon film. Further, because carbon has lubricity, the coefficient of friction with respect to the magnetic head is small, and as a result, an excessively large friction is prevented from being introduced at the surfaces of the magnetic recording medium and the magnetic head.

However, it has been found that under a dew atmosphere, rust occurs and corrosion takes place on the magnetic layer of the magnetic recording medium having no carbon film on the magnetic layer and even on the magnetic layer of the magnetic recording medium having the thin carbon film formed on the magnetic layer. The present inventors have studied this phenomenon and found that the thin carbon film itself has an internal stress, and that cracks are formed in the thin carbon film due to a slight change in the ambient condition or even under a steady condition in an extreme case. When cracks are formed in the thin carbon film, moisture enters through the cracks and the corrosion takes place on the magnetic layer.

In order to improve the corrosion resistance of the magnetic layer, a film made of $SiO_2$ was experimentally formed on the magnetic layer as a corrosion resisting layer. Further, a lubricant layer made of carbon was additionally formed on the corrosion resisting layer so as to improve the lubricity. However, even in this case, it was found that cracks are formed not only in the carbon lubricant layer but also in the corrosion resisting layer due to the internal stress of the lubricant layer, and that the corrosion resistance is poor.

SUMMARY OF THE INVENTION

Accordingly, it is a general object of the present invention to provide a novel and useful magnetic recording medium in which the problems described heretofore are eliminated.

Another and more specific object of the present invention is to provide a magnetic recording medium having lubricity on a surface thereof and also having corrosion resistance for preventing corrosion of a magnetic layer thereof. The present invention provides a magnetic recording medium which comprises a lubricant layer made of carbon, for example, formed on the magnetic layer, and a corrosion resisting layer having corrosion resistance formed additionally on the lubricant layer. According to the magnetic recording medium of the present invention, the internal stress of the lubricant layer is relaxed by the provision of the corrosion resisting layer. As a result, cracks are not easily formed in the lubricant layer, and the corrosion of the magnetic layer is prevented.

Still another object of the present invention is to provide a magnetic recording medium which comprises a corrosion resisting layer formed on a magnetic layer, a lubricant layer formed on the corrosion resisting layer, and an additional corrosion resisting layer formed on the lubricant layer. According to the magnetic recording medium of the present invention, corrosion resistance is further improved while maintaining lubricity.

Other objects and further features of the present invention will be apparent from the following detailed description when read in conjunction with the accompanying drawings.

DETAILED DESCRIPTION

Figure 1:
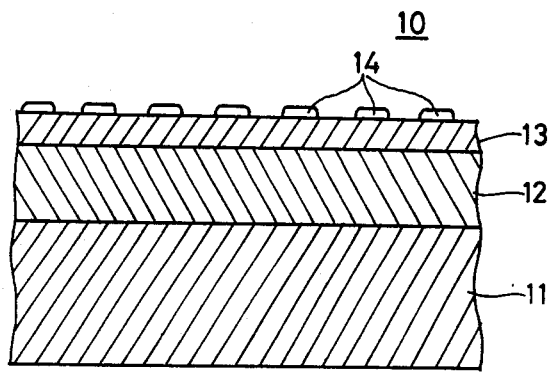
FIG. 1 is an enlarged vertical cross section showing a part of an embodiment of the magnetic recording medium according to the present invention.

An embodiment of the magnetic recording medium according to the present invention is shown in FIG. 1. A magnetic recording medium 10 comprises a base 11 which has a disc shape and is made of aluminum having a non-magnetic plated layer of Ni—P plated on a surface thereof, for example. A thin film magnetic layer 12 which is a plated layer of Co—P, for example, is formed on the base 11. In addition to Co—P, it is possible to use other magnetic materials such as Co, Co—Ni, and Co—Ni—P for the magnetic layer 12.

A lubricant layer 13 made of a material such as carbon which has lubricity is formed on the magnetic layer 12. A corrosion resisting layer 14 having corrosion resistance is formed on the lubricant layer 13. In addition to carbon, materials having lubricity such as molbdenum disulfide, carbon nitride, and boron nitride may be used for the lubricant layer 13. Materials having corrosion resistance such as chromium, titanium, Ni—Cr alloy, Fe—Cr alloy, Co—Cr alloy, molybdenum, TiC, TiN, zinc, aluminum, Fe—Ni alloy, and Fe—Ni—Cr alloy may be used for the corrosion resisting layer 14.

Next, description will be given with respect to examples of forming the lubricant layer 13 and the corrosion resisting layer 14.

EXAMPLE 1

The base 11 having the magnetic layer 12 formed on an upper surface thereof is put into a DC magnetron sputtering apparatus, for example, and is subjected to a sputter etching in an argon gas of $5 \times 10^{-3}$ Torr, for example. Thereafter, a carbon layer having a thickness in the range of approximately 5 nm to 200 nm, for example, a thickness of 60 nm, is formed on the magnetic layer 12 by sputtering. As a result, the lubricant layer 13 is formed on the magnetic layer 12.

Next, a layer of $Co_{0.8}Cr_{0.2}$ having a thickness in the range of approximately 1 nm to 7 nm, for example, 2 nm, is formed on the lubricant layer 13 by sputtering. As a result, the corrosion resisting layer 14 is formed on the lubricant layer 13. When the corrosion resisting layer 14 is formed to have such an extremely small thickness, the corrosion resisting layer 14 does not cover the entire upper surface of the lubricant layer 13. In other words, the corrosion resisting layer 14 actually comprises a plurality of insular films existing locally on the lubricant layer 13. When the sputtering time is made short, the sputtering is terminated in an initial stage of the formation of the layer by the sputtering, and for this reason, the corrosion resisting layer 14 does not cover the entire upper surface of the lubricant layer 13 and is only distributed locally on the lubricant layer 13.

A test was performed with the present embodiment of the magnetic recording medium according to the present invention by use of the type 3350 head for hard disc manufactured by IBM Corporation of the United States having a floating quantity of 0.25 $\mu$m and a gap length of 1.4 $\mu$m. As a result of a contact-start-stop (hereinafter simply referred to as CSS) test, it was found that no damages are introduced to the magnetic head nor the magnetic recording medium even after 20,000 starts and stops. In addition, there was no deterioration in the reproduced output. It is thought that such results are obtained because the lubricant layer 13 is partially exposed, and because a satisfactory lubricity is obtained when the magnetic head makes contact with the lubricant layer 13 regardless of the existence of the corrosion resisting layer 14 due to slight irregularities on the surface of the magnetic head in the order of nm. On the other hand, it is seen that the provision of the corrosion resisting layer 14 does not introduce undesirable effects to the reproducing characteristics.

In addition, the error rate was examined after leaving the present embodiment of the magnetic recording medium according to the present invention under an ambient condition of 60° C. and 90% RH for 250 hours. It was found that there is essentially no increase in the error rate, and the superior corrosion resistance was confirmed. It is thought that this result is obtained because the internal stress of the lubricant layer 13 is relaxed by the provision of the corrosion resisting layer 14 and cracks are not easily formed in the lubricant layer 13.

EXAMPLE 2

The manufacturing method is the same as that of the Example 1 described above. However, in the present example, the thickness of the lubricant layer 13 is over 200 nm, for example, 300 nm. The remaining numerical values are the same as the Example 1.

The error rate was examined after leaving the magnetic recording medium under the same ambient condition for the same length of time as those described in the Example 1. It was found that there is essentially no increase in the error rate, and the superior corrosion resistance was confirmed. As a result of the CSS test by use of the same magnetic head used in the Example 1, it was found that no damages are introduced to the magnetic head nor the magnetic recording medium even after 20,000 starts and stops.

However, compared to the Example 1, a slight deterioration was seen in the reproduced output due to the thicker lubricant layer 13. Hence, the quality of the magnetic recording medium of the present example is slightly poorer compared to the magnetic recording medium of the Example 1.

EXAMPLE 3

The manufacturing method is the same as that of the Example 1 described above. However, in the present example, the thickness of the lubricant layer 13 is under 5 nm, for example, 2 nm. The remaining numerical values are the same as the Example 1.

The error rate was examined after leaving the magnetic recording medium under the same ambient condition for the same length of time as those described in the Example 1. It was found that there is essentially no increase in the error rate, and the superior corrosion resistance was confirmed. However, as a result of the CSS test by use of the same magnetic head used in the Example 1, a head crash occurred after 6,000 starts and stops. Accordingly, it was found that the lubricant layer 13 in this example is too thin and wears out quickly due to friction, and that the lubricity of this magnetic recording medium is poor.

EXAMPLE 4

The manufacturing method is the same as that of the Example 1 described above. However, in the present example, the thickness of the corrosion resisting layer 14 is over 8 nm, for example, 10 nm. The remaining numerical values are the same as the Example 1.

The error rate was examined after leaving the magnetic recording medium under the same ambient condition for the same length of time as those described in the Example 1. It was found that there is essentially no increase in the error rate, and the superior corrosion resistance was confirmed. However, as a result of the CSS test by use of the same magnetic head used in the Example 1, a head crash occurred after 6,000 starts and stops. Accordingly, it was found that the entire the lubricant layer 13 in this example is covered by the corrosion resisting layer 14, and that the desired lubricity cannot be obtained in this magnetic recording medium.

For the purpose of comparison, a magnetic recording medium was made wherein no corrosion resisting layer 14 is provided and only the lubricant layer 13 is provided on the magnetic layer 12. This magnetic recording medium was recorded with information and subjected to a corrosion resistance test by leaving the magnetic recording medium under an ambient condition of 60° C. and 90% RH for 250 hours. As a result of the test, it was found that corrosion was taking place on virtually the entire surface of the magnetic layer 12. Deterioration was seen in the magnetization, and the magnetic recording medium was simply poor in durability.

In addition, for the purpose of another comparison, a magnetic recording medium was made wherein no lubricant layer 13 and no corrosion resisting layer 14 are provided and only the magnetic layer 12 is provided. This magnetic recording medium was recorded with information and subjected to a corrosion resistance test by leaving the magnetic recording medium under the same ambient condition described above for 90 hours. As a result of the test, it was found that corrosion was taking place on the entire surface of the magnetic layer 12 and the magnetization was greatly deteriorated. Hence, this magnetic recording medium had no durability. In addition, as a result of the CSS test, the reproduced output greatly deteriorated after 4,000 starts and stops, and the magnetic recording medium was simply not suited for practical use.

It may therefore be understood from these comparison examples that the magnetic recording medium according to the present invention is superior both in lubricity and corrosion resistance.

Accordingly, the durability of the lubricity becomes deteriorated when the lubricant layer 13 is too thin, but the reproducing characteristic becomes deteriorated when the lubricant layer 13 is too thick. Hence, the thickness of the lubricant layer 13 should be over approximately 5 nm, and preferably selected in the range of approximately 5 nm to 200 nm. On the other hand, the internal stress of the lubricant layer 13 cannot be sufficiently relaxed and the corrosion resistance is poor when the corrosion resisting layer 14 is too thin, but the corrosion layer 14 will not be distributed in an insular manner and will cover the entire surface of the lubricant layer 13 when the corrosion resisting layer 14 is too thick. Hence, the thickness of the corrosion resisting layer 14 is preferably selected in the range of approximately 1 nm to 7 nm.

The formation of the corrosion resisting layer 14 is not limited to the sputtering method, and for example, an ion doping method may be used. In this case, the corrosion resisting layer 14 will coexist on the lubricant layer 13.

Figure 2:
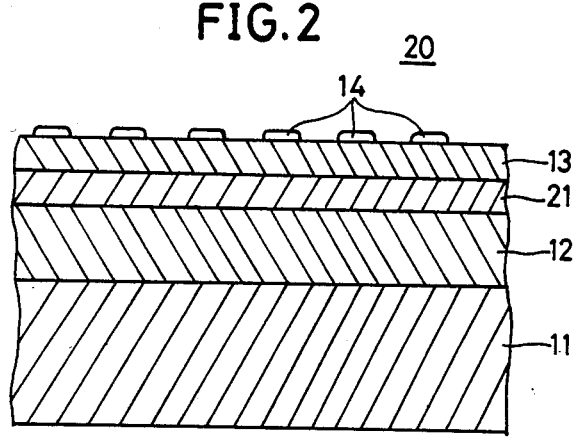
FIG. 2 is an enlarged vertical cross section showing a part of another embodiment of the magnetic recording medium according to the present invention.

Another embodiment of the magnetic recording medium according to the present invention is shown in FIG. 2. In FIG. 2, those parts which are the same as those corresponding parts in FIG. 1 are designated by the same reference numerals, and description thereof will be omitted.

In the present embodiment, a magnetic recording medium 20 comprises a corrosion resisting layer 21 formed on the magnetic layer 12, and the lubricant layer 13 and the corrosion resisting layer 14 which are the same as those corresponding layers of the embodiment described before are successively formed on the corrosion resisting layer 21. A material selected out of the materials described before which can be used for the corrosion resisting layer 14, is used for the corrosion resisting layer 21.

In the present embodiment, the internal stress of the lubricant layer 13 can be relaxed more positively due to the provision of the corrosion resisting layer 21, and the corrosion resistance of the magnetic recording medium is even better than that of the embodiment described before.

The effect of relaxing the internal stress of the lubricant layer 13 cannot be obtained when the corrosion resisting layer 21 is too thin, but the separation between the magnetic head and the magnetic layer 12 increases and the recording and reproducing characteristic becomes deteriorated when the corrosion resisting layer 21 is too thick. Accordingly, the thickness of the corrosion resisting layer 21 should be over approximately 2 nm, preferably in the range of approximately 2 nm to 100 nm.

On the other hand, since the separation between the magnetic head and the magnetic layer 12 increases due to the provision of the additional corrosion resisting layer 21, and upper limit of the thickness of the lubricant layer 13 is reduced by a quantity corresponding to the thickness of the corrosion resisting layer 21. Thus, the thickness of the lubricant layer 13 is preferably selected in the range of approximately 5 nm to 100 nm. From the point of view of not deteriorating the recording and reproducing characteristic, it is desirable that the combined thickness of the corrosion resisting layer 21, the lubricant layer 13, and the corrosion resisting layer 14 is under 200 nm.

In an example corresponding to the Example 1 in the embodiment described before, test results similar to those obtained in the Example 1 were obtained when the magnetic recording medium was made by selecting the thicknesses of the corrosion resisting layer 21, the lubricant layer 13, and the corrosion resisting layer 14 to 30 nm, 30 nm, and 2 nm, respectively. In addition, test results similar to those obtained in the Examples 2 through 4 in the embodiment described before were obtained when the magnetic recording medium was made by selecting the thicknesses of the layers similarly as in the Examples 2 through 4.

In each of the embodiments described heretofore, the layers 12, 13, and 14 and the layers 12, 21, 13, and 14 may be formed on only one surface of the base 11, or on both surfaces of the base 11.

Further, the present invention is not limited to these embodiments, but various variations and modifications may be made without departing from the scope of the present invention.

What is claimed is:

1. A magnetic recording medium comprising:
   a base;
   a magnetic layer formed on the base, said magnetic layer being made of a magnetic material;
   a lubricant layer formed on the magnetic layer, said lubricant layer being made of a lubricant material having lubricity; and having a thickness in a range of approximately 5 nm to 200 nm; and
   a corrosion resisting layer formed on the lubricant layer, said corrosion resisting layer being made of a corrosion resisting material having corrosion resistance and being distributed locally on said lubricant layer so that at least a part of said lubricant layer is exposed, said corrosion resisting layer having a thickness in a range of approximately 1 nm to 7 nm.

2. A magnetic recording medium as claimed in claim 1 in which said corrosion resisting material is selectd out of a group of chromium, titanium, Ni—Cr alloy, Fe—Cr alloy, Co—Cr alloy, molybdenum, TiC, TiN, zinc, aluminum, Fe—Ni alloy, and Fe—Ni—Cr alloy.

3. A magnetic recording medium as claimed in claim 1 in which said lubricant material is selected out of a group of carbon, molybdenum disulfide, carbon nitride, and boron nitride.

4. A magnetic recording medium as claimed in claim 1 in which said corrosion resisting layer is distributed locally on said lubricant layer in an insular manner.

5. A magnetic recording medium comprising:
a base;
a magnetic layer formed on the base, said magnetic layer being made of a magnetic material;
a first corrosion resisting layer formed on said magnetic layer, said first corrosion resisting layer being made of a first corrosion resisting material having corrosion resistance and having a thickness in a range of a approximately 2 nm to 100 nm;
a lubricant layer formed on the first corrosion resisting layer, said lubricant layer being made of a lubricant material having lubricity and having a thickness in a range of approximately 5 nm to 100 nm; and
a second corrosion resisting layer formed on the lubricant layer, said second corrosion resisting layer having made of a second corrosion resisting material being corrosion resistance and being distributed locally on said lubricant layer so that at least a part of said lubricant layer is exposed said second corrosion layer having a thickness in a range of approximately 1 nm to 7 nm.

6. A magnetic recording medium as claimed in claim 5 in which said first and second corrosion resisting materials are selected out of a group of chromium, titanium, Ni—Cr alloy, Fe—Cr alloy, Co—Cr alloy, molybdenum, TiC, TiN, zinc, aluminum, Fe—Ni alloy, and Fe—Ni—Cr alloy.

7. A magnetic recording medium as claimed in claim 5 in which said lubricant material is selected out of a group of carbon, molybdenum disulfide, carbon nitride, and boron nitride.

* * * * *